(12) United States Patent
Alber

(10) Patent No.: US 10,471,551 B2
(45) Date of Patent: Nov. 12, 2019

(54) LASER ABLATION AND WELDING METHOD FOR WORKPIECES

(71) Applicant: WISCO LASERTECHNIK GMBH, Ravensburg (DE)

(72) Inventor: Gerhard Alber, Berg/Ravensburg (DE)

(73) Assignee: Wisco Lasertechnik GmbH, Ravensburg (DE)

( * ) Notice: Subject to any disclaimer, the term of this patent is extended or adjusted under 35 U.S.C. 154(b) by 346 days.

(21) Appl. No.: 15/444,855

(22) Filed: Feb. 28, 2017

(65) Prior Publication Data

US 2017/0182603 A1 Jun. 29, 2017

Related U.S. Application Data

(63) Continuation of application No. PCT/EP2015/065648, filed on Jul. 9, 2015.

(30) Foreign Application Priority Data

Sep. 8, 2014 (DE) .......................... 10 2014 112 888

(51) Int. Cl.
*B23K 26/00* (2014.01)
*B23K 26/02* (2014.01)
*B23K 37/047* (2006.01)
*B23K 37/02* (2006.01)
*B23K 37/04* (2006.01)
(Continued)

(52) U.S. Cl.
CPC ............ *B23K 37/047* (2013.01); *B23K 26/02* (2013.01); *B23K 26/083* (2013.01); *B23K 26/0869* (2013.01); *B23K 26/26* (2013.01); *B23K 26/361* (2015.10); *B23K 37/02* (2013.01); *B23K 37/0235* (2013.01); *B23K 37/0408* (2013.01); *B23K 37/0435* (2013.01); *B23Q 7/02* (2013.01); *B23K 2101/18* (2018.08)

(58) Field of Classification Search
CPC .. B23K 2101/18; B23K 26/02; B23K 26/083; B23K 26/0869; B23K 26/26; B23K 26/361; B23K 37/02; B23K 37/0235; B23K 37/0408; B23K 37/0435; B23K 37/047; B23Q 7/02
USPC ................. 219/121.6–121.86, 101–107, 136
See application file for complete search history.

(56) References Cited

U.S. PATENT DOCUMENTS

2009/0159579 A1* 6/2009 Nishio .................... B23K 26/03
219/121.63
2011/0240612 A1 10/2011 Maeno
2014/0270922 A1* 9/2014 Evangelista ......... B23K 9/0026
403/270

FOREIGN PATENT DOCUMENTS

CN 102307702 A 1/2012
DE 10 2010 060 958 A1 6/2012
(Continued)

OTHER PUBLICATIONS

English translation of International Preliminary Report on Patentability (Application No. PCT/EP2015/065648) dated Mar. 23, 2017.
(Continued)

*Primary Examiner* — Sang Y Paik
(74) *Attorney, Agent, or Firm* — Burr & Brown, PLLC

(57) ABSTRACT

The present invention relates to a laser ablation and welding method for workpieces, in particular, metal sheets, and an automatic laser ablation and welding system, where an ablation procedure and a welding procedure are executed in an automation line.

10 Claims, 7 Drawing Sheets

(51) Int. Cl.
*B23K 26/08* (2014.01)
*B23K 26/26* (2014.01)
*B23K 26/361* (2014.01)
*B23Q 7/02* (2006.01)
*B23K 101/18* (2006.01)

(56) References Cited

FOREIGN PATENT DOCUMENTS

| EP | 1 529 593 A1 | 5/2005 |
| EP | 2 377 642 A1 | 10/2011 |
| JP | 10-166159 A1 | 6/1998 |

OTHER PUBLICATIONS

German Office Action (Application No. 10 2014 112 888.5) dated Mar. 2, 2015.
International Search Report and Written Opinion (Application No. PCT/EP2015/065648) dated Nov. 24, 2015.

\* cited by examiner

LASER ABLATION AND WELDING METHOD FOR WORKPIECES

CROSS REFERENCE TO RELATED APPLICATIONS

This application is a continuation of International Application No. PCT/EP2015/065648 filed Jul. 9, 2015, which designated the United States, and claims the benefit under 35 USC § 119(a)-(d) of German Application No. 10 2014 112 888.5 filed Sep. 8, 2014, the entireties of which are incorporated herein by reference.

FIELD OF THE INVENTION

The present invention relates to a laser ablation and welding method for workpieces, in particular, metal sheets, and also an automatic laser ablation and welding system.

BACKGROUND OF THE INVENTION

Systems are known in the prior art of DE 10 2010 060 958 A1, in which workpieces are positioned, aligned, and then processed in the working region of a laser. Typically, such procedures, which are highly sensitive with respect to the alignment of the workpieces, are always executed in a specialized workstation in the sequence that each processing step comprises insertion and alignment of the workpiece in a clamping device.

It is disadvantageous in this case that the removal from one processing station, the insertion and positioning in a new processing station, and then the clamping for processing are accompanied by substantial handling effort, which substantially reduces the efficiency of a processing station.

SUMMARY OF THE INVENTION

The object of the present invention is, therefore, to improve the processing of workpieces in laser processing stations in the efficiency thereof.

The laser ablation and welding method according to the invention for workpieces, in particular, metal sheets, comprises the following method steps:
a. inserting at least two workpieces into a clamping unit;
b. clamping the workpieces in the clamping unit via one first clamping mechanism each in a first position;
c. aligning the clamped workpieces and the first clamping mechanism, which clamps the workpieces, in a first ablation position;
d. ablation of at least one joining edge of at least one clamped workpiece by means of at least one laser head;
e. clamping a first of the at least two workpieces via a second clamping mechanism in the first position and disengaging the first clamping mechanism at the first of the at least two workpieces;
f. moving the first clamping mechanism in the direction of the joining edge at the first workpiece;
g. clamping the first workpiece via the first clamping mechanism, disengaging the second clamping mechanism, and aligning the first workpiece and the first clamping mechanism in a joining position;
h. clamping a second of the at least two workpieces via the second clamping mechanism in the first position and disengaging the first clamping mechanism at the second of the at least two workpieces;
i. moving the first clamping mechanism in the direction of the/one joining edge at the second workpiece;
j. clamping the second workpiece via the first clamping mechanism, disengaging the second clamping mechanism, and aligning the second workpiece and the first clamping mechanism in the joining position;
k. connecting, in particular laser welding the workpieces at the respective joining edge; and
l. disengaging the first clamping mechanism and transferring the joined workpieces to a transport unit.

It is essential that the workpieces never have to be removed from the clamping mechanism, even if a plurality of processing steps is performed, so that effort for handling the workpieces is nearly entirely omitted.

After the first insertion of at least two workpieces into a clamping unit, the workpieces remain in the clamping unit until the removal after the processing. Solely controlled and defined repositioning and alignment of the clamped workpieces are performed in the processing cycle, without a removal being required.

The processing steps of ablation and welding by means of laser are sufficiently known to a person skilled in the art. For the sake of completeness, it is to be noted that laser ablation, also called laser vaporization, refers to the removal of material from a surface by bombardment using preferably pulsed laser radiation. The laser radiation having high power density which is used in this case results in rapid heating at the surface, whereby material is removed. Welding by means of laser is a welding method in which the required energy for connecting the workpieces is provided by means of a laser.

In one advantageous refinement of the method, it is provided that before the insertion, an automated pre-positioning step is executed by a transfer from a first robot via a positioning device to a second robot.

The pre-positioning or pre-picking enables insertion of identical or different blanks with increased precision into the clamping unit, in particular, by an insertion robot having a single handling device (for example, suction head) for the at least two workpieces. First alignment step b) is thus facilitated and can be executed more rapidly.

Furthermore, it is preferable for at least one alignment in method step c), g), or j) to be performed by a movement in a floating manner of the workpieces toward a stop or the like with subsequent clamping fixation of a respective suspension of the respective first clamping mechanism.

The floating movement for positioning of the clamped workpieces takes place via movement of the workpieces in the horizontal plane, without a defined linear movement axis being predefined. The workpieces are moved in a floating manner, i.e., so they are pivotable or rotatable about an axis perpendicular to the plane, to a stop, until a contact at at least two points and, therefore, a defined alignment of a workpiece edge in the plane has occurred. The clamping device is then fixed by its suspension in this position, so that exact positioning in the plane occurs and is secured.

In addition, it is preferably provided that the ablation in method step d) is executed via at least two laser heads, wherein preferably one laser head is arranged on a workpiece upper side and one laser head is arranged on a workpiece lower side.

The typically planar workpieces made of metal sheet sections, so-called "blanks", are to be connected to one another by welding while carrying out the method according to the invention. For this purpose, joining edges, i.e., edges for forming the connection, are pretreated by ablation in the method. The workpiece upper side and the workpiece lower side are to be understood as the faces of the workpieces in this case. Typically, the lower side will be at least partially in contact with the first clamping mechanism, while the upper side is preferably free.

The processing using one laser head each on the workpiece upper side and on the workpiece lower side enables increased processing speed and avoids complex repositioning of the laser head from above to below with precise alignment on the joining edge to be processed.

During this processing, it is furthermore advantageous if the laser heads travel down the joining edges of the workpieces successively on a circumferential path, wherein, in particular, the laser heads are not directly diametrically opposite on workpiece upper side and workpiece lower side at any point in time.

The successive movement of the laser heads on a circumferential path, which lies in the processing plane of the workpieces, avoids the laser heads mutually influencing one another, in particular, the laser beams of one laser head striking the other laser head and being able to damage it in this case. Influencing the workpieces themselves by overload with laser radiation is also avoided.

It is furthermore preferably provided that automatic cleaning of the joining edge, in particular, brushing or polishing, is performed between method step d) and e).

The cleaning of the edges processed by ablation offers advantages for the further processing. In particular residues of removed material or contaminants can be lastingly removed in the joining edge region in this case, if the quality of the joining edges is improved by means of brushing or polishing.

According to the present invention, an automatic laser ablation and welding system is also disclosed for joining at least two workpieces, in particular, two metal sheets, wherein the ablation and welding system comprises at least one clamping unit, a first positioning station, an ablation station, a second positioning station, and a welding station: the laser ablation and welding system is characterized in that the at least two workpieces can be ablated, joined, and welded in a single clamping unit.

The present invention offers the advantage that handling and re-clamping of a processing step is avoided, whereby the processing time is shortened and therefore the efficiency is increased.

In one preferred embodiment of the ablation and welding system, it is provided that it comprises a turntable having a plurality of clamping units, wherein the clamping units are movable via the turntable from position to position.

The arrangement of the clamping units on a turntable enables each cycle of the method to be carried out successively in a revolving manner, and the clamping units having clamped workpieces to pass through various processing stations in succession in the form of a processing train or processing line.

It is particularly advantageous in this case if the clamping unit comprises at least one clamping magnet per workpiece.

Workpieces in the form of metal sheets or the like may be fixed, positioned, and disengaged precisely via clamping magnets, without mechanical chucking devices having to be adapted to the workpiece contour.

An expanded embodiment provides that at least one clamping magnet per workpiece is arranged so it is movable in a floating manner in the clamping unit and is fixable, in particular via chucking devices, in a position approached in a floating manner.

In this manner, the clamping and the above-described movement in a floating manner toward the positioning means may be implemented more easily, because only the floating movement of the magnet head has to be executed in one plane, in particular, by incremental movement of two feed axes, which are parallel but not synchronous and are spaced apart from one another, for the clamping magnets.

In addition, it is to be noted that both the first and also the second clamping mechanism can be embodied as clamping magnets. In practice, it has been shown that designing the first clamping mechanism as a clamping magnet and the second clamping mechanism as a friction-locked clamping-chucking device represents the preferred cost-effective and most efficient solution.

BRIEF DESCRIPTION OF THE DRAWINGS

The present invention will be explained hereafter on the basis of schematic exemplary embodiments. However, the invention is not restricted to the illustrated embodiment.

DETAILED DESCRIPTION OF THE INVENTION

Figure 1A:
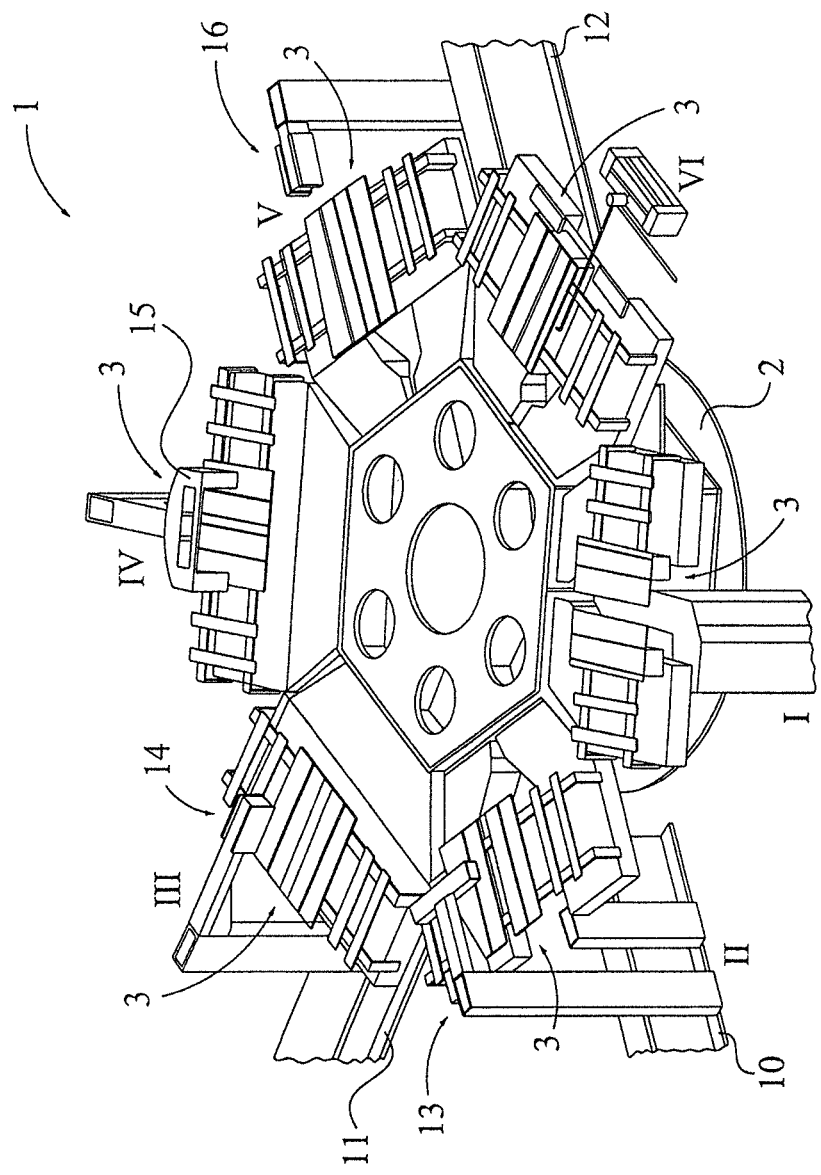
FIG. 1a shows an ablation and welding system in a top view.

In detail, FIG. 1a shows a laser ablation and welding system 1 according to the present invention in a perspective top view. The laser ablation and welding system 1 comprises a turntable 2 having a total of six clamping units 3 arranged at six different processing positions I to VI. The processing positions I to VI are arranged circumferentially around the axis of rotation 4 and can be transferred one into another via a rotation by 60° in the processing cycle.

Linear traverses 10, 11, and 12 are arranged at the processing stations II, III, and V. A laser ablation device 13 is arranged on the linear traverse 10, which can be moved by displacement on the linear traverse 10 into a region above and below the clamping unit 3 in the position II, to carry out the processing step of laser ablation.

The linear traverse 11 carries a processing head for the optional procedure of cleaning by brushing or polishing, wherein this procedure is also performed by retracting the processing head 14 into the region of the clamping unit 3 in the processing station III.

A chucking holder 15 is arranged in the station IV, which fixes the workpieces in the processing station on the clamping unit 3 at position IV for repositioning the first clamping mechanism, to provide the alignment of the joining edges for the subsequent welding procedure in position V.

The linear traverse 12 is provided at position V, which in a corresponding manner embodies the laser welding head 16 as linearly movable into and out of the processing region of the clamping unit 3 at the position V.

Figure 1B:
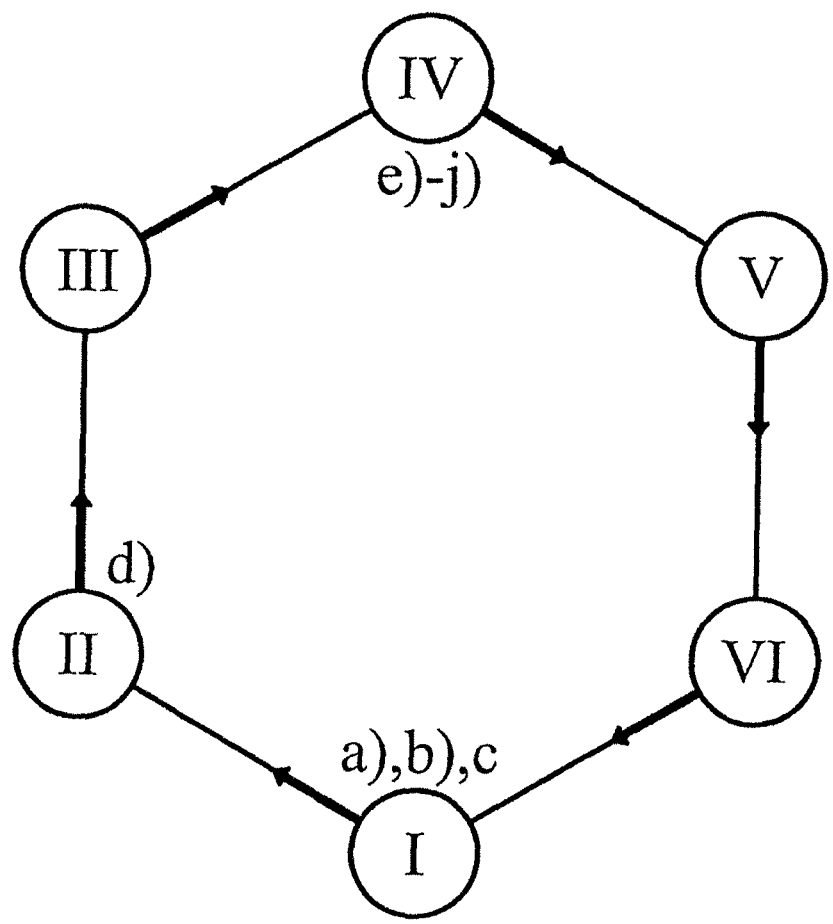
FIG. 1b shows a flow chart of an ablation and welding method.

FIG. 1b schematically shows the sequence of the processing method according to the present invention in accordance with an arrangement on a turntable 2 according to FIG. 1a. Method steps a and b and c take place in the position I. The clamping unit 3 is then moved further into the position II for processing in the ablation station 13 by rotating the turntable 2. Method step d is executed therein. The optional method step of cleaning is performed in position III, wherein, as described above, a brush head 14 cleans, in particular polishes, the joining edges after completed ablation. The application of the brush head or the polishing unit can be performed either from above, from below, or on both sides.

In position IV, re-clamping and alignment (joining) of the treated joining edges of the workpieces to be welded to one another is performed, wherein method steps e to j are executed.

By further rotation by 60° of the turntable 2, the clamping unit 3 is transferred from the position IV into the position V, where the welding of the workpieces aligned in the joining position is then performed by means of the laser welding head 16.

After completion of the processing method and further rotation of the turntable 2 with the clamping unit 3 out of the welding station V into the removal position VI, the finished processed plate, consisting of two workpieces welded to one another, is provided for unloading.

Figure 2A:
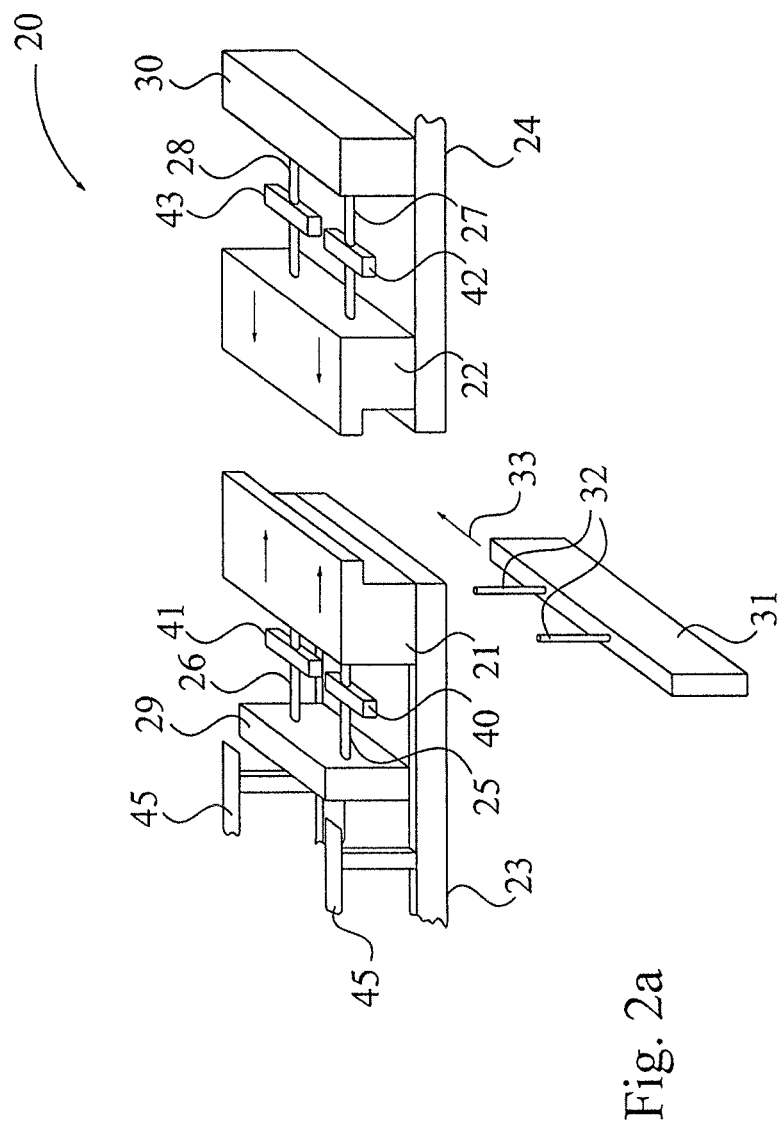
FIG. 2a shows a schematic illustration of a clamping unit.

FIG. 2a shows a schematic illustration of a clamping unit 20, which has clamping mechanisms 21, 22 in the form of clamping magnets. The clamping mechanisms 21, 22 are arranged so they are displaceable on a frame 23, 24 and can be moved toward or away from one another in a floating manner via in each case two parallel threaded spindles (25, 26 and 27, 28) spaced apart from one another. The threaded spindles (25 to 28) are driven in this case by drive units 29, 30 such that workpieces (not shown) held on the clamping mechanisms 21, 22 can be moved toward one another. For exact positioning in a first ablation position, a stop 31 having positioning pins 32 is introduced in the direction 33 between the clamping mechanisms 21 and 22 having workpieces arranged thereon, so that the joining edges of the workpieces are moved in a floating manner toward the positioning pins 32 by moving the clamping mechanisms 21, 22 via the threaded spindles 25 to 28 and can be stopped. As soon as the first ablation position is reached, the positions of the clamping mechanisms 21, 22 are locked via blocking devices 40 to 43, so that during further processing of the workpieces on the clamping unit 20 in another processing station (I to VI) the positioning is maintained, because the clamping unit remains connected to the workpieces until the completion of the processing. Alternatively or additionally to the blocking devices, the possibility also exists of fixing the clamping mechanism via the drive units 29, 30.

To also be able to accommodate and handle large workpieces in a simple and precise manner, the clamping unit 20 has support means 45, which are only shown by way of example in the present case.

Figure 2B:
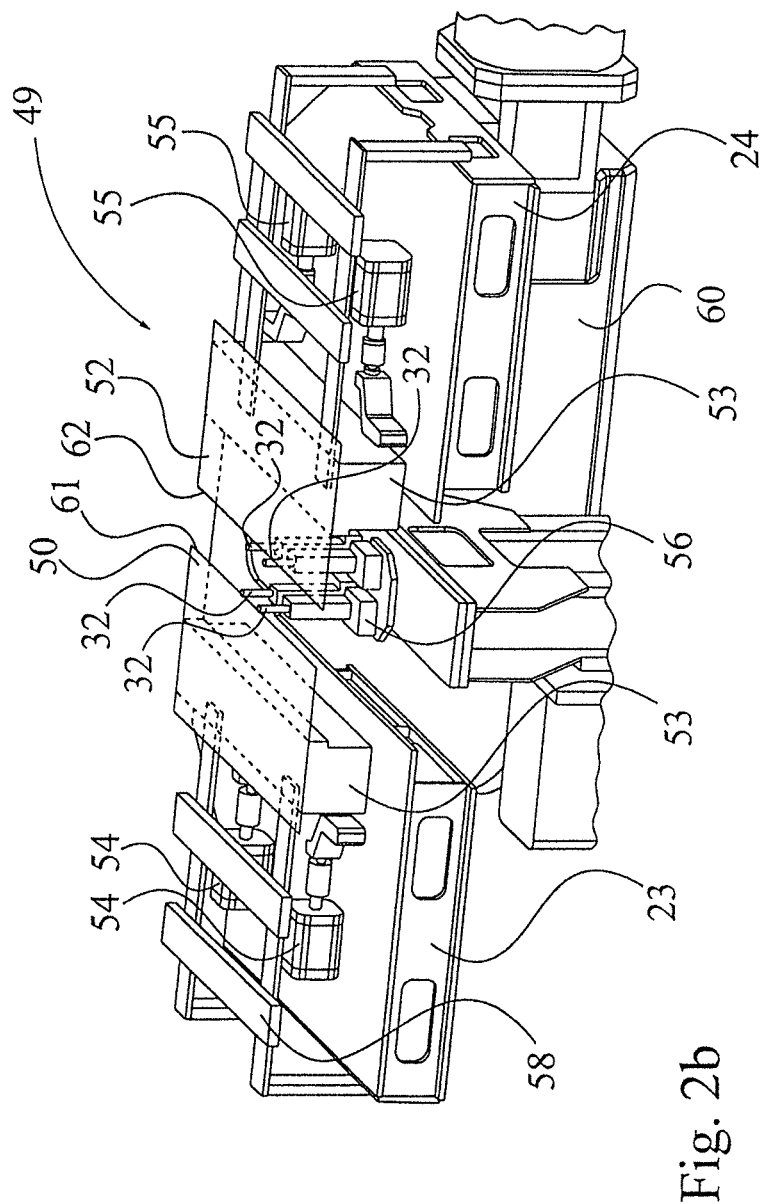
FIG. 2b shows a schematic illustration of a clamping unit with workpiece.

FIG. 2b shows an embodiment of the clamping unit 49 with arranged workpieces 50, 51. The clamping magnets 52, 53 hold the workpieces and are moved in a floating manner via the drives 54, 55 in accordance with the above-described embodiment toward the stop pins 56 and positioned. The workpieces 50, 51 are shown in shortened form in the present case, so that the supports 58 are visible. The entire clamping unit 49 is mounted on a turntable 60. A pre-positioning step (not shown) enables the insertion of the workpieces 50, 51 by means of a single robot handling device, for example, a suction gripper on a multiaxis robot, so that comparatively precise alignment of the joining edges 61, 62 of the workpieces 50, 51 is already performed in the pre-positioning.

For the sake of completeness, it is to be noted that instead of the threaded spindles 25 to 28, other devices, for example, linear adjusters, pneumatic or hydraulic adjusters, or other actuators come into consideration, which enable a floating approach in the meaning of the invention by corresponding arrangement and fixing. In particular the use of pneumatic cylinders can offer the additional advantage that a defined force can be exerted during the floating approach via the pneumatic control pressure, to set the position as exactly as possible, before it is locked by means of blocking devices.

Figure 3A:
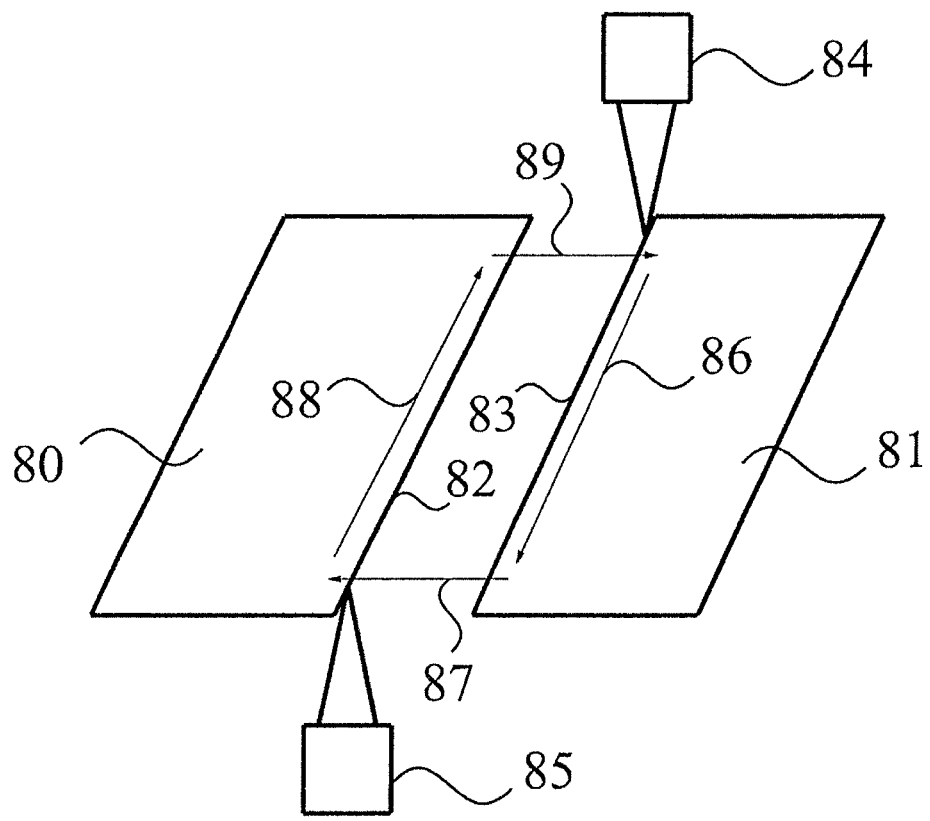
FIG. 3a shows a schematic illustration of the movement of the laser heads in the ablation step.

FIG. 3a shows a schematic illustration of the movement of the laser heads in the ablation step. The two workpieces 80, 81 aligned in the ablation position are processed at the joining edges 82, 83 thereof by means of a first laser head 84 from the upper side thereof and a second laser head 85 from the lower side thereof. The laser heads run in this case along the path described by arrows 86, 87, 88, and 89 successively following the contour of the joining edges 82, 83, so that the ablation step occurs without the laser heads being diametrically opposed at any processing point in time.

Figure 3B:
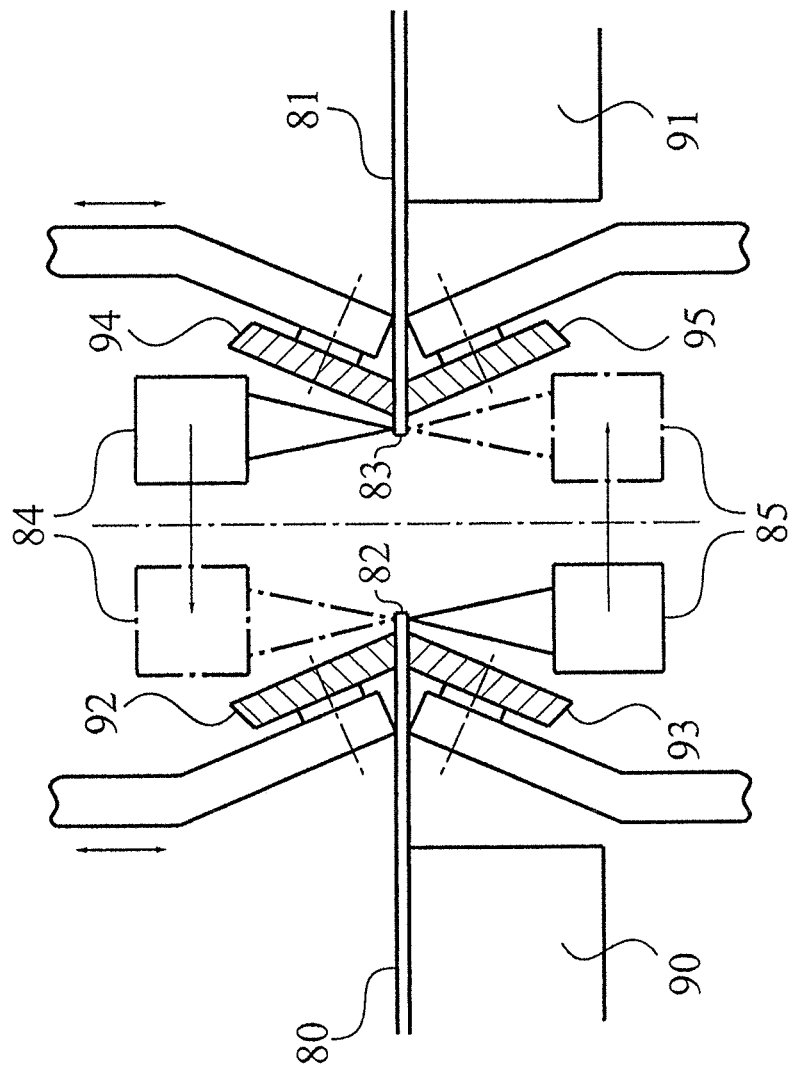
FIG. 3b shows a schematic illustration in the longitudinal direction of the laser heads in the ablation step.

FIG. 3b shows a schematic illustration in the longitudinal direction of the laser heads 84 and 85, wherein the laser head 84 is ready at the end of the path 86 to change along the path 87 and the laser head 85 performs the change along the path 89. The workpieces 80, 81 are held by clamping magnets 90, 91, wherein for improved precision of the processing at the joining edges 82, 83 using the laser heads 84, 85, tracked roller pairs 92, 93 and 94, 95 are moved to hold the joining edges 82, 83 exactly in the processing position thereof in vertical alignment.

Figure 4:
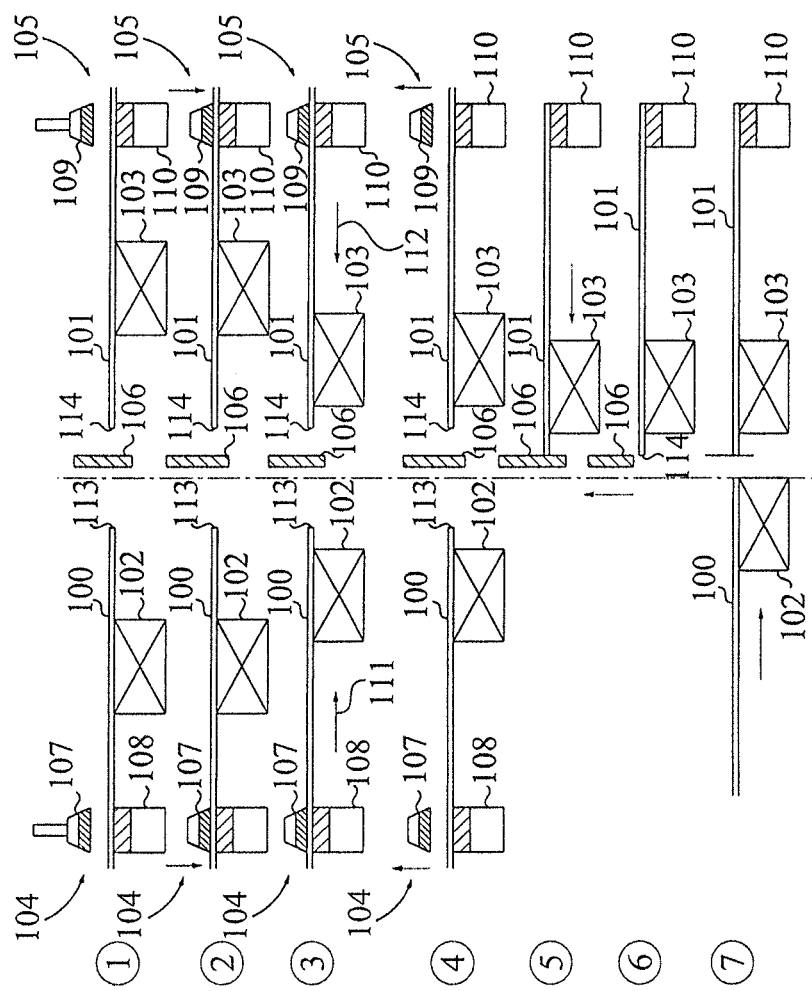
FIG. 4 shows the sequence of the alignment from an ablation position into a joining position.

FIG. 4 shows the sequence in seven steps of the displacement of the first clamping mechanism according to features e) to j) of the method according to the present invention.

The workpieces 100 and 101 are introduced into the station IV and are held at this point in time using the first clamping mechanisms 102 and 103 in the form of clamping magnets. The second clamping mechanisms 104 and 105 are open at this point in time and do not exert clamping force on the workpieces 100, 101. After introduction into the station IV, a stop 106 is introduced. In a second step of the sequence in the station IV, the second clamping mechanisms 104, 105 are closed by closing an upper clamping jaw 107 against a lower clamping block 108 in the region of the first workpiece 100 and closing an upper clamping jaw 109 against a lower clamping block 110 in the region of the workpiece 101. The first clamping mechanisms 102 and 103 are then disengaged and moved toward the stop 106 along a movement direction 111 and 112. This can be performed via the above-described drives for the floating approach of a position. The second clamping mechanisms 104 and 105 hold the workpieces 100 and 101 in position in this case.

After completion of the movement of the first clamping mechanisms 102 and 103 in step 4, the second clamping mechanisms 104, 105 are disengaged, after the first clamping mechanisms 102, 103 have again securely clamped the workpieces 100, 101, in that the magnetic field of the clamping magnets was activated. In step 5, a first movement of the workpiece 101 via movement of the clamping mechanism 103 having clamped workpiece 101 toward the stop 106 is then performed for alignment in a joining position for a subsequent welding step. In step 6, the stop 106 is then removed, after which, in step 7, via movement of the first clamping mechanism 102 having workpiece 100 fixed thereon, this workpiece 100 is moved with its joining edge 113 on the stop toward the joining edge 114 of the second workpiece 101. The positions of the first clamping mechanisms 102 and 103 are then locked in a known manner and the clamping unit is introduced into the laser processing station V, so that the workpieces 100, 101 can be welded to one another.

After completed welding, the resulting, processed workpiece is transferred into the position VI for unloading, for example, by an unloading robot, after which the clamping unit can be rotated further into the position I for renewed loading and first alignment.

The first and the second clamping mechanisms can also be designed differently than described in the exemplary embodiments. In particular, the second clamping mechanism can consist of a stationary arrangement of clamping jaws in the station IV and a tracked clamping block, for example, in the form of the support 45, 58.

LIST OF REFERENCE NUMERALS

1 system
2 turntable
3 clamping unit
10 linear traverse
11 linear traverse
12 linear traverse
13 laser ablation device
14 processing head
15 chucking holder
16 laser welding head
20 clamping unit
21 clamping mechanism
22 clamping mechanism
23 frame
24 frame
25-28 threaded spindle
29 drive unit
30 drive unit
32 positioning pin
33 direction
40-43 blocking device
45 support means
49 clamping unit
50 workpiece
51 workpiece
52 clamping magnet
53 clamping magnet
54 drive
55 drive
60 turntable
61 joining edge
62 joining edge
80 workpiece
81 workpiece
82 joining edge
83 joining edge
84 laser head
85 laser head
86-89 path
90 clamping magnet
91 clamping magnet
92-95 roller pair
100 workpiece
101 workpiece
102 clamping mechanism
103 clamping mechanism
104 clamping mechanism
105 clamping mechanism
106 stop
107 upper clamping jaw
108 lower clamping block
109 upper clamping jaw
110 lower clamping block
111 movement direction
112 movement direction
113 joining edge
114 joining edge

The invention claimed is:

1. A laser ablation and welding method for workpieces, comprising:
   a) inserting at least two workpieces into a clamping unit;
   b) clamping the workpieces in the clamping unit via a first clamping mechanism each in a first position;
   c) aligning the clamped workpieces and the first clamping mechanism, which clamps the workpieces, in a first ablation position;
   d) ablating at least one joining edge of at least one clamped workpiece using at least one laser head;
   e) clamping a first of the at least two workpieces via a second clamping mechanism in the first position and disengaging the first clamping mechanism at the first of the at least two workpieces;
   f) moving the first clamping mechanism in a direction of a joining edge of the first workpiece;
   g) clamping the first workpiece via the first clamping mechanism, disengaging the second clamping mechanism, and aligning the first workpiece and the first clamping mechanism in a joining position;
   h) clamping a second of the at least two workpieces via the second clamping mechanism in the first position and disengaging the first clamping mechanism at the second of the at least two workpieces;
   i) moving the first clamping mechanism in a direction of a joining edge of the second workpiece;
   j) clamping the second workpiece via the first clamping mechanism, disengaging the second clamping mechanism, and aligning the second workpiece and the first clamping mechanism in the joining position;
   k) connecting via welding the workpieces at the respective joining edge; and
   l) disengaging the first clamping mechanism and transferring the joined workpieces to a transport unit.

2. The method as claimed in claim 1, wherein before insertion in step a) an automated pre-positioning step is executed by a transfer from a first robot via a positioning device to a second robot.

3. The method as claimed in claim 1, wherein at least one alignment in steps c), g), or j) is performed by a movement in a floating manner of the workpieces toward a stop with subsequent clamping fixation of a respective suspension of the respective first clamping mechanism.

4. The method as claimed in claim 1, wherein ablation in step d) is executed via at least two laser heads, wherein one laser head is arranged on a workpiece upper side and one laser head is arranged on a workpiece lower side.

5. The method as claimed in claim 4, wherein the laser heads travel down the joining edges of the workpieces successively on a circumferential path, such that the laser heads are not directly diametrically opposite on the workpiece upper side and the workpiece lower side at any point in time.

6. The method as claimed in claim 1, further comprising automatic cleaning of the joining edge between steps d) and e).

7. The method as claimed in claim 6, wherein the automatic cleaning is performed by brushing.

8. The method as claimed in claim 6, wherein the automatic cleaning is performed by polishing.

9. The method as claimed in claim 1, wherein the workpieces are metal sheets.

10. The method as claimed in claim 1, wherein the welding in step k) is laser welding.

* * * * *